US008234339B2

(12) United States Patent
Adams et al.

(10) Patent No.: US 8,234,339 B2
(45) Date of Patent: Jul. 31, 2012

(54) SYSTEM AND METHOD FOR HANDLING ELECTRONIC MESSAGES

(75) Inventors: Neil P. Adams, Waterloo (CA); David Victor MacFarlane, Waterloo (CA); Ian M. Robertson, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1594 days.

(21) Appl. No.: 11/157,506

(22) Filed: Jun. 21, 2005

(65) Prior Publication Data

US 2006/0019639 A1 Jan. 26, 2006

Related U.S. Application Data

(60) Provisional application No. 60/581,650, filed on Jun. 21, 2004.

(51) Int. Cl.
*G06F 15/16* (2006.01)
(52) U.S. Cl. ........ 709/206; 709/202; 709/203; 709/205; 726/3; 455/466
(58) Field of Classification Search ................. 709/202, 709/206, 203, 205; 726/3; 455/466
See application file for complete search history.

(56) References Cited

U.S. PATENT DOCUMENTS

| 5,239,679 | A | 8/1993 | Murai |
| 5,958,005 | A | 9/1999 | Thorne et al. |
| 6,324,569 | B1 * | 11/2001 | Ogilvie et al. ............ 709/206 |
| 6,487,586 | B2 * | 11/2002 | Ogilvie et al. ............ 709/206 |
| 6,643,684 | B1 | 11/2003 | Malkin et al. |
| 6,701,347 | B1 * | 3/2004 | Ogilvie .................... 709/206 |
| 6,711,608 | B1 * | 3/2004 | Ogilvie .................... 709/206 |
| 6,757,713 | B1 * | 6/2004 | Ogilvie et al. ............ 709/206 |
| 6,769,067 | B1 | 7/2004 | Soong |
| 7,035,904 | B1 * | 4/2006 | Jordan, Jr. ............... 709/206 |
| 7,764,970 | B2 * | 7/2010 | Neil et al. ................. 455/466 |
| 2002/0002581 | A1 * | 1/2002 | Siddiqui ................... 709/202 |
| 2002/0004899 | A1 * | 1/2002 | Azuma ..................... 713/152 |
| 2002/0178381 | A1 | 11/2002 | Lee et al. |
| 2003/0018724 | A1 * | 1/2003 | Mathewson et al. ...... 709/206 |
| 2003/0188183 | A1 | 10/2003 | Lee et al. |
| 2005/0193078 | A1 * | 9/2005 | Jordan ..................... 709/206 |

(Continued)

FOREIGN PATENT DOCUMENTS

CA  2263171 A1  12/1998

(Continued)

OTHER PUBLICATIONS

International Search Report of Application No. PCT/CA2005/000961, date of mailing Sep. 13, 2005-14 pgs.

(Continued)

*Primary Examiner* — Thu Ha Nguyen
(74) *Attorney, Agent, or Firm* — Conley Rose, P.C.; J. Robert Brown, Jr.

(57) ABSTRACT

Systems and methods for handling messages on a mobile device. A system and method could be configured to receive at a mobile device a message that is associated with a message expiry indicator. If a message expiry indicator is determined to be associated with the received message, then the received message is removed from the mobile device.

20 Claims, 15 Drawing Sheets

U.S. PATENT DOCUMENTS

| | | | |
|---|---|---|---|
| 2006/0019639 A1 | 1/2006 | Adams et al. | |
| 2007/0116281 A1 | 5/2007 | Brown et al. | |
| 2007/0208762 A1 | 9/2007 | Lunt et al. | |
| 2009/0265763 A1* | 10/2009 | Davies et al. | 726/3 |
| 2010/0069104 A1* | 3/2010 | Neil et al. | 455/466 |
| 2010/0070600 A1* | 3/2010 | Schulzrinne et al. | 709/206 |
| 2010/0287249 A1* | 11/2010 | Yigang et al. | 709/206 |
| 2011/0078273 A1* | 3/2011 | Wang | 709/206 |
| 2011/0238762 A1* | 9/2011 | Soni et al. | 709/206 |

FOREIGN PATENT DOCUMENTS

| | | | |
|---|---|---|---|
| CA | 2396415 A1 | 7/2001 | |
| EP | 1365340 A2 | 11/2003 | |
| WO | WO 0122243 A1 | 3/2001 | |
| WO | 2004107687 A | 12/2004 | |

OTHER PUBLICATIONS

Van Otterloo, Sieuwert, "A Security Analysis of Pretty Good Privacy"; Sep. 7, 2001; (pp. 17, 55, 56).

Extended European Search Report issued in respect to EP Patent Application No. 05111192.0.

Brown, Michael K., et al. U.S. Appl. No. 11/285,198, filed Nov. 23, 2005; Title: Email with Secure Message Parts.

Office Action dated Apr. 1, 2009, 7 pages, U.S. Appl. No. 11/285,198, filed Nov. 23, 2005.

Final Office Action dated Dec. 28, 2009; 13 pages, U.S. Appl. No. 11/285,198, filed Nov. 23, 2005.

Office Action dated Jun. 11, 2009; 3 pages; Application Serial No. CA 2,572,391, filed on Jun. 21, 2005.

* cited by examiner

SYSTEM AND METHOD FOR HANDLING ELECTRONIC MESSAGES

RELATED APPLICATION

This application claims priority to and the benefit of U.S. Provisional Application Ser. No. 60/581,650, filed on Jun. 21, 2004, entitled "SYSTEM AND METHOD FOR HANDLING ELECTRONIC MESSAGES" of which the entire disclosure (including any and all figures) of the application is incorporated herein by reference.

BACKGROUND

1. Technical Field

This document relates generally to the field of communications, and in particular to handling electronic messages on mobile wireless communications devices.

2. Description of the Related Art

Mobile wireless communications devices are configured to send and receive e-mail messages, over a network. Some e-mail content is secure and should be handled with additional care. However, while a message recipient may have the intent to properly dispose of a secure message, a message recipient may forget, may take too long or may not bother to do so. For mobile devices that do not have physical security (e.g., locked in a room), this is especially a concern.

DETAILED DESCRIPTION

Figure 1:
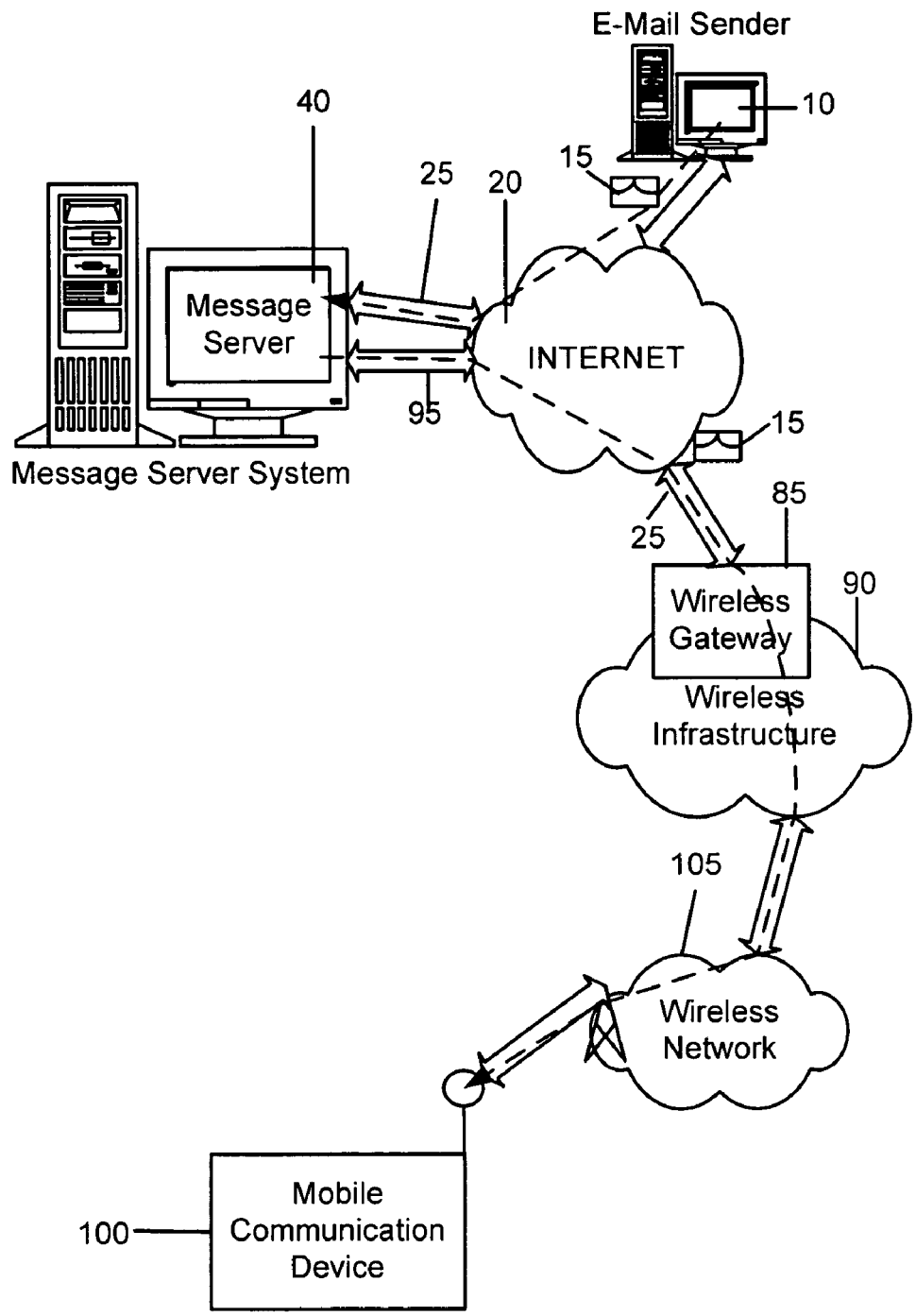
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have pre-defined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
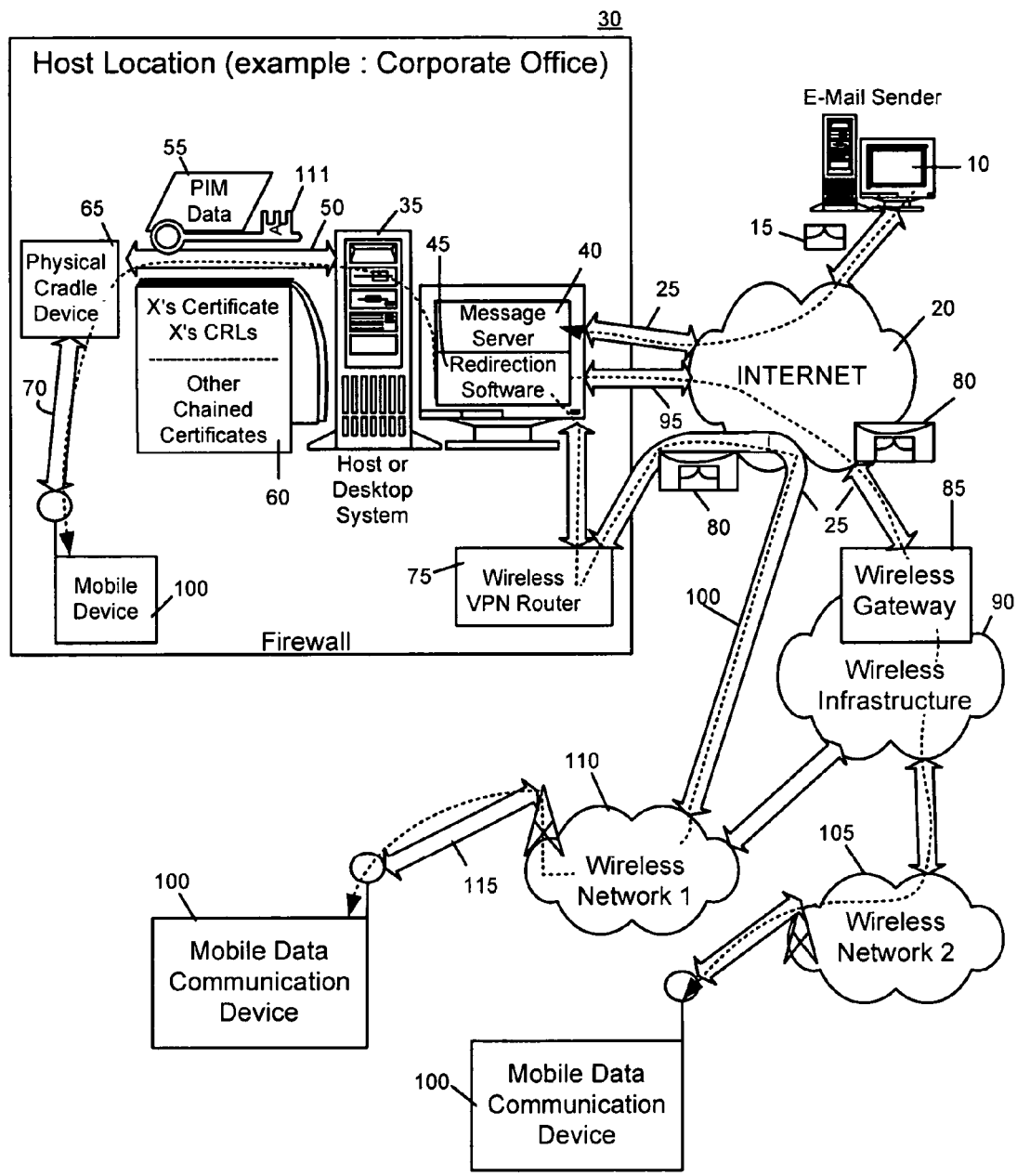
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
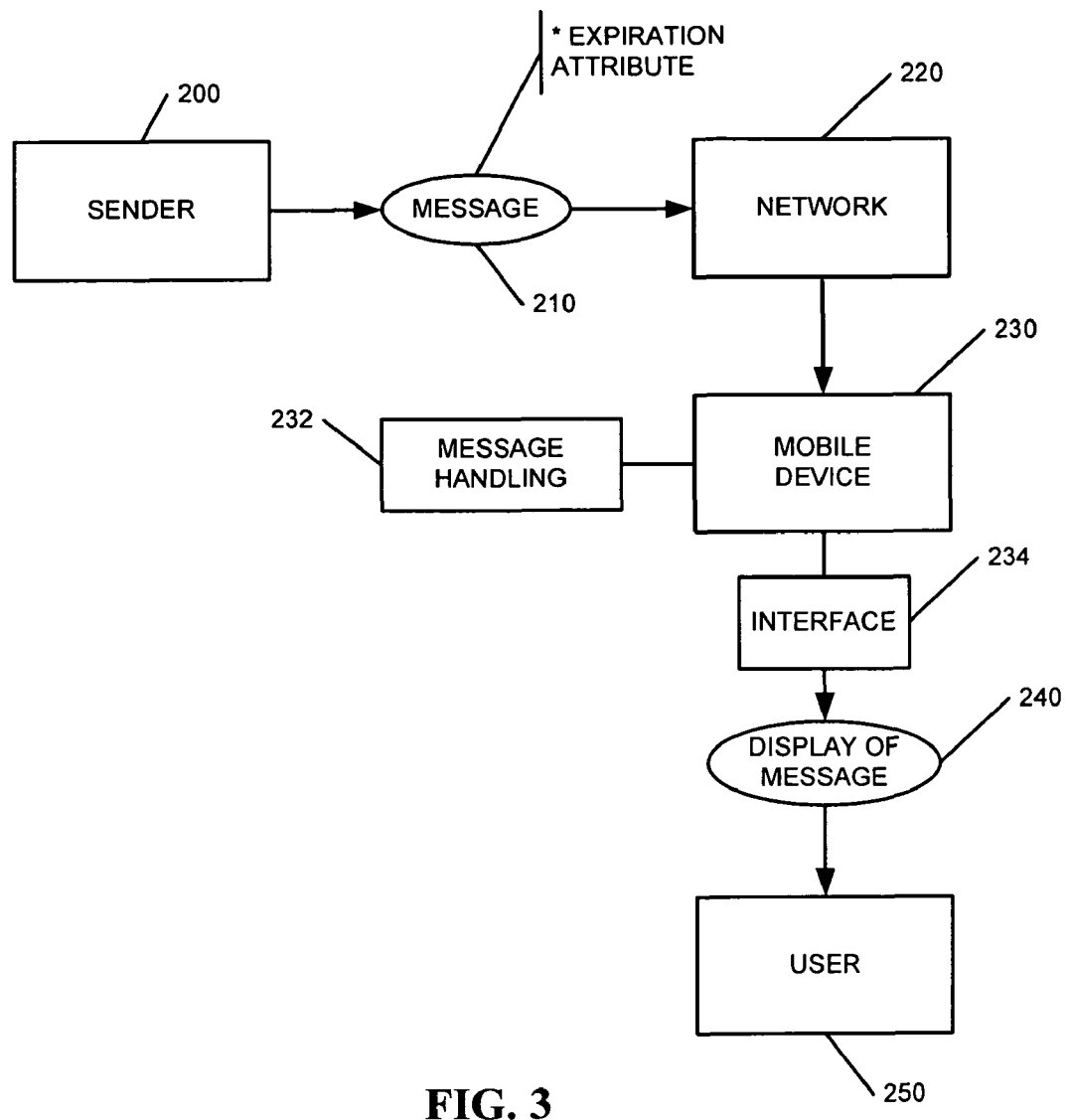
FIG. 3 is a block diagram depicting a sender sending an e-mail message with a content expiry attribute.

FIG. 3 depicts a sender 200 sending an e-mail message 210 with a content expiry attribute. When a sender 200 sends the message 210, the sender 200 can choose which form of message expiry the sender 200 wishes, and the details of this expiry notification could be encoded in a signed attribute of the secure e-mail message 210 or otherwise. The message 210 is sent over a network 220 (e.g., a wireless communications network) to a mobile device 230.

The mobile device 230 receives the message 210 over the network 220. The device 230 contains message handling functionality 232 (e.g., processor instructions) to handle messages that have the expiration attribute set, such as for sensitive, secure, and/or confidential messages.

This attribute can be in many different forms. As an illustration, a sender 200 can specify that the message 210 is to be deleted after it is read or the message 210 is to be deleted after a specific amount of time (e.g., from when the message is received or read).

The message handling instructions 232 can be configured to handle the set attributes. As an illustration, when a message is viewed and closed, the instructions 232 can be configured to inspect the message to see if the content expiry attribute is set. If it is, the device 230 automatically removes the message for the recipient. As an illustration, if a message's content expiry attribute is set and the recipient has accessed the message, then the device 230 can automatically remove (e.g., delete) the message for the recipient. As an illustration of another approach, if a message's content expiry attribute is set and the recipient has read the entire message (e.g., the recipient has received all the message chunks or pieces and/or the message has been displayed to the recipient at 240), the device 230 automatically removes the message for the recipient.

Figure 4:
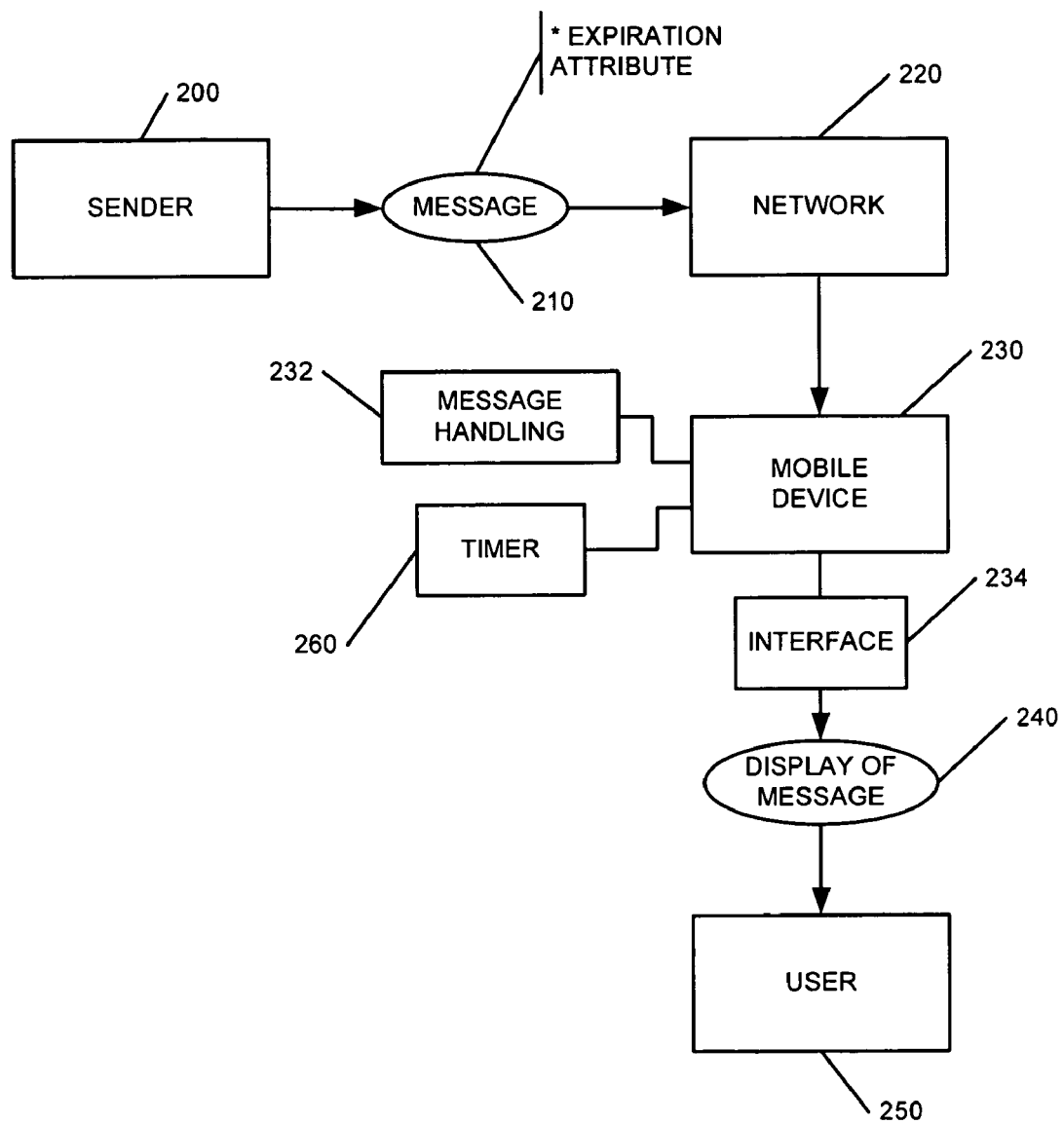
FIG. 4 is a block diagram wherein a message is received that contains a timeout notification expiry attribute.

As an example of another approach which is shown in FIG. 4, when a message 210 is received that contains a timeout notification expiry attribute, the device 230 can set a timer 260 for the specified timeout period. When the timer 260 expires, the device 230 automatically removes the message. If the attribute is for a timeout period after the message is read, the timer 260 can be started after the user 250 closes the message, or when the message is received.

Figure 5:
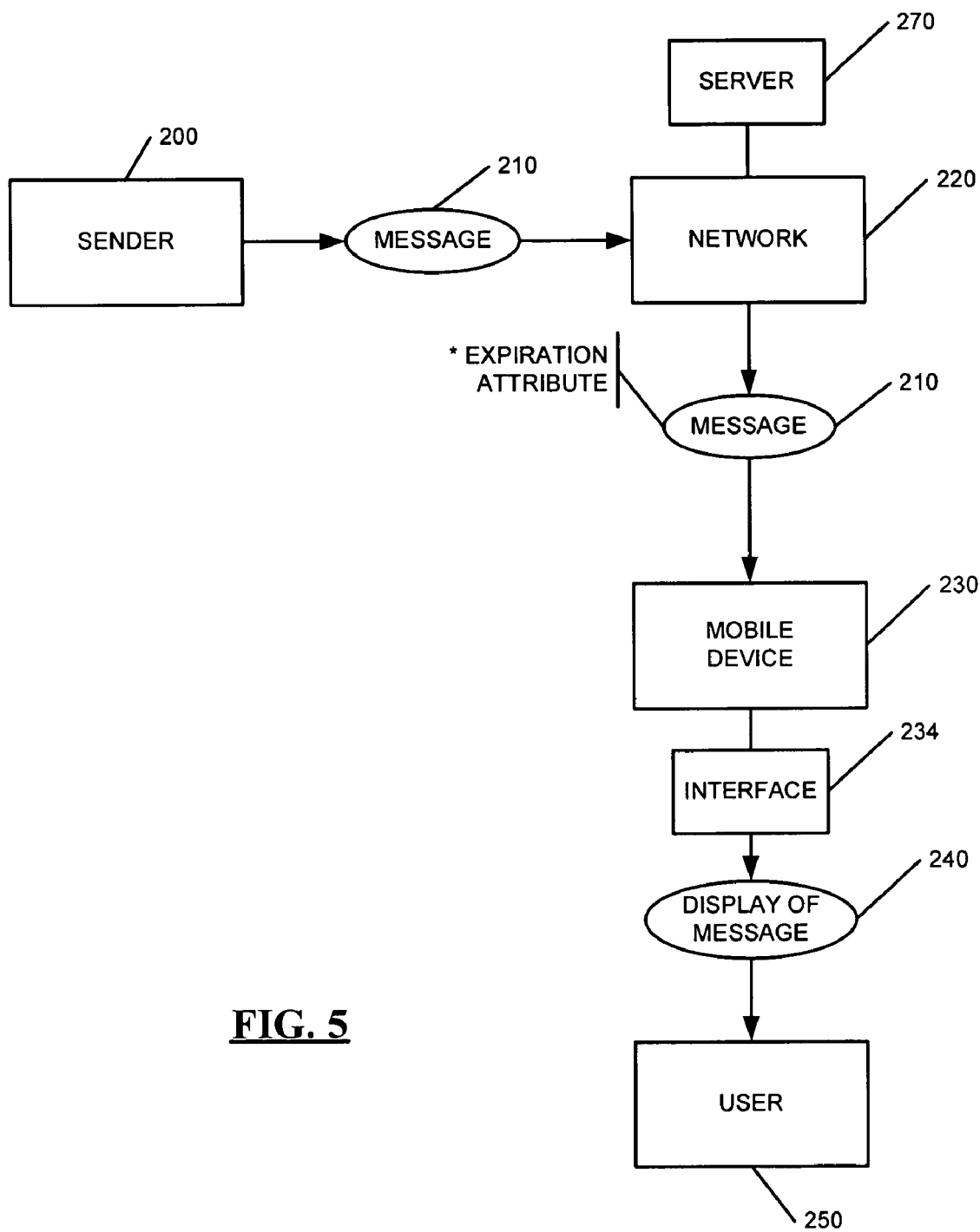
FIG. 5 is a block diagram depicting a server setting a content removal attribute.

A sender 200 can set a content removal attribute, or as shown in FIG. 5, a server 270 can set the content removal attribute before the message is delivered to the one or more recipients. Moreover, notification types can be combined, such as removing a message after a period of time after receiving the message or after reading the message, whichever comes first. Also a sender 200 can be notified when the sender's message has been removed from the mobile device 230.

It should be understood that the message processing flows described above and elsewhere may have their respective steps and order of steps altered, modified, deleted and/or augmented and still achieve the desired outcome. As examples of this, multiple different operational scenarios are shown in FIGS. 6-13.

Figure 6:
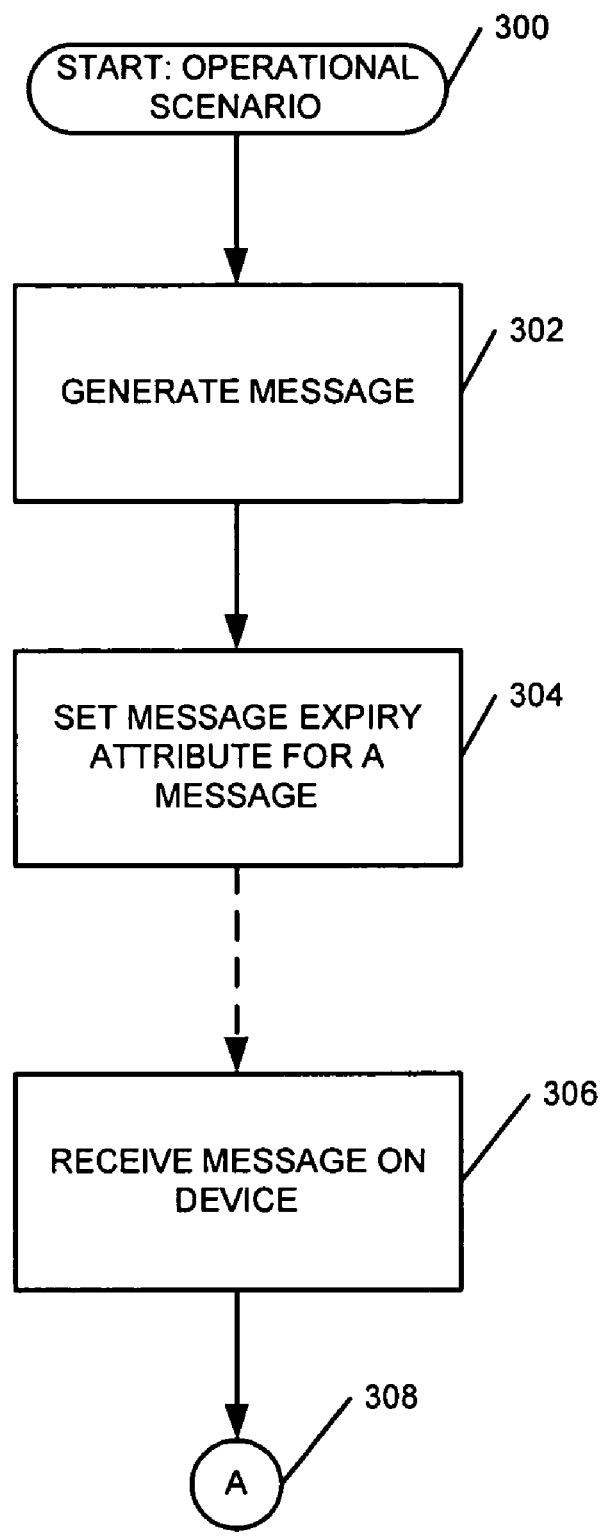
FIGS. 6-13 are flow charts depicting different operational scenarios for handling messages.

FIG. 6 illustrates an example operational scenario for handling a message that may have a message expiry attribute set. The operational scenario starts at 300. At process block 302, a message is generated, and, for the generated message, a message expiry attribute is set at process block 304. At process block 306, the message is received by the recipient on the device. Continuation marker 308 indicates that processing for this operational scenario continues on FIG. 7 at process block 310.

Figure 7:
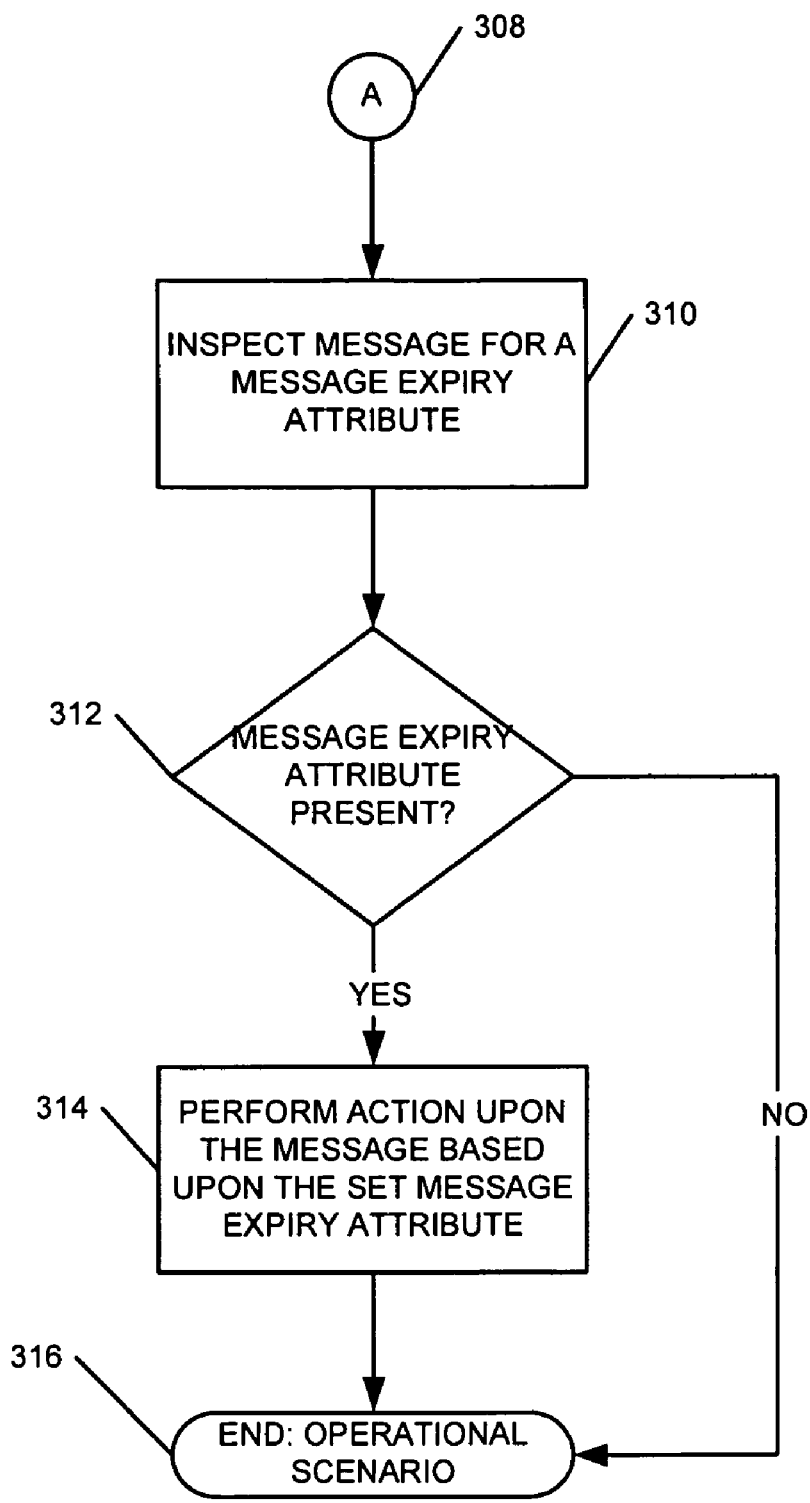

With reference to FIG. 7, the received message is inspected for a message expiry attribute. Decision block 312 determines whether a message expiry attribute is present based upon the inspection performed by process block 310. If a message expiry attribute is not present as determined by decision block 312, then for this operational scenario, processing ends at end block 316. However if decision block 312 determines that a message expiry attribute is present, then process block 314 performs an action upon the message based upon the message expiry attribute. For example, the message can automatically be deleted after the message has been read by the recipient. Processing ends for this operational scenario at end block 316.

Figure 8:
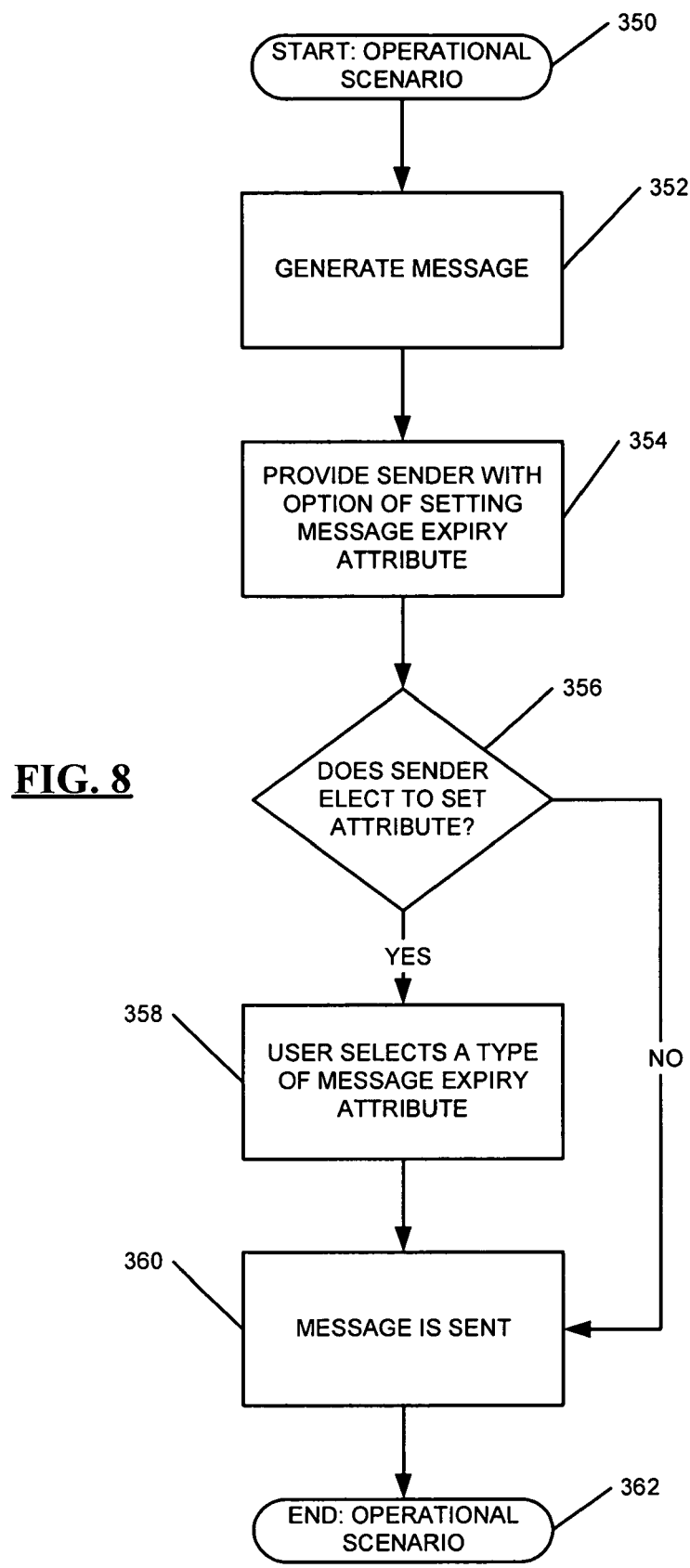

FIG. 8 depicts an operational scenario that can be used when sending a message. The operational scenario starts at 350. At process block 352, a message is generated and the sender of the message is provided with an option of setting a message expiry attribute for the generated message at process block 354. If the sender does not decide to set a message expiry attribute as handled at decision block 356, then processing continues at process block 360 wherein the message is sent and processing for this sender-based operational scenario ends at end block 362.

If the sender does decide to set a message expiry attribute with the message that was generated at process block 352, then the user selects at process block 358 that a message expiry attribute should be set. The message expiry attribute is then associated with the generated message. It should be understood that the sender can also indicate that a specific type of message expiry attribute should be used. The sender could specify this at different points in the process, such as before, during and/or after composing the message. The sender could also only be presented with the option of whether a message expiry attribute should be set, with the type of message expiry attribute already being predetermined.

After the message expiry attribute is associated with the message, then the message is sent to the one or more recipients at process block 360. Processing for this sender-based operational scenario ends at end block 362.

Figure 9:
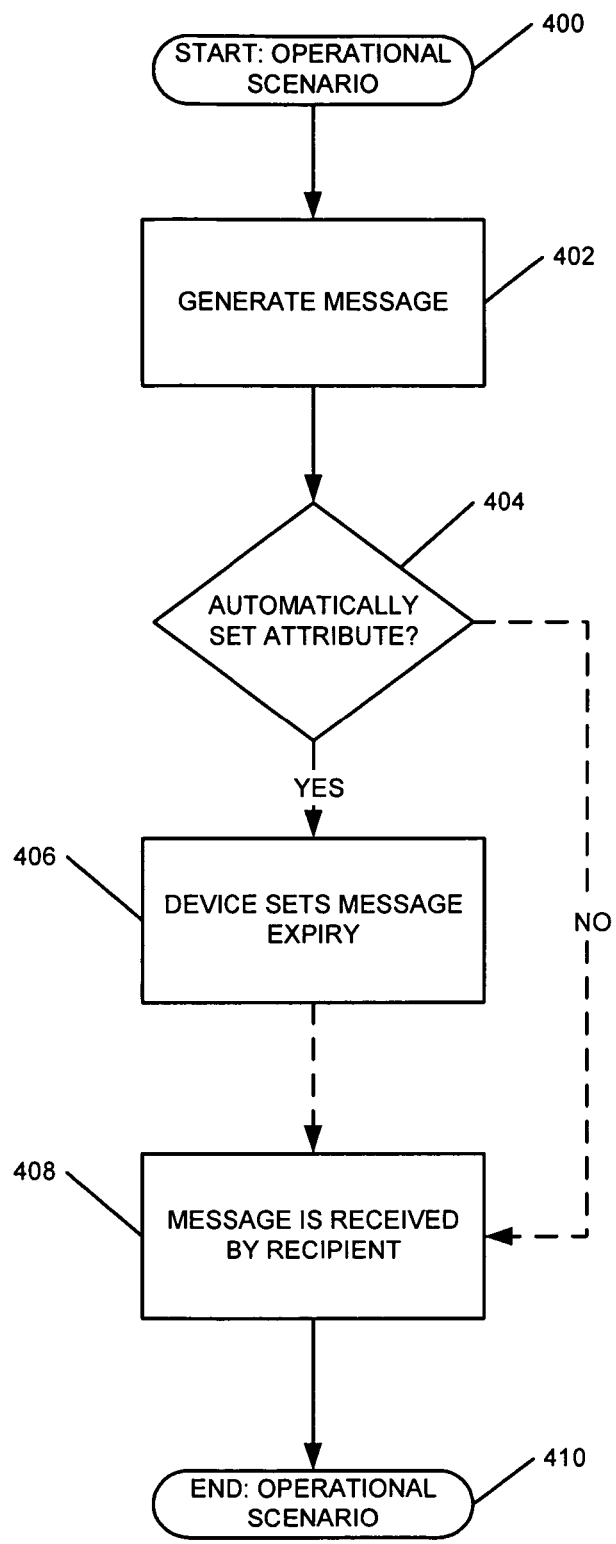

FIG. 9 depicts another operational scenario that can be used when sending a message. The operational scenario starts at 402. At process block 402, a message is generated for delivery to one or more recipients. Decision block 404 determines whether a message expiry attribute should automatically be set for the generated message. This automatic determination can be performed at the sender's computer or at any other point along the message transmission path, such as at the sender's and/or recipient's server. Decision step 404 may base its automatic determination upon one or more factors. As an illustration, the automatic determination may be established such that every secure message sent will have a message expiry attribute associated with it. As another illustration, all the messages indicated as confidential or top secret (e.g., by the sender, by a message status indicator, etc.) will automatically have associated with such messages a message expiry attribute.

If decision block 404 determines that the message expiry attribute is not to be set automatically, then processing continues at process block 408 wherein the one or more recipients receive the message. However if decision block 404 determines that the message expiry attribute is to be set automatically, then process block 406 sets the message expiry attribute for the message. At process block 408, the message is received by the recipient. This operational scenario for sending a message to one or more recipients ends at end block 410.

Figure 10:
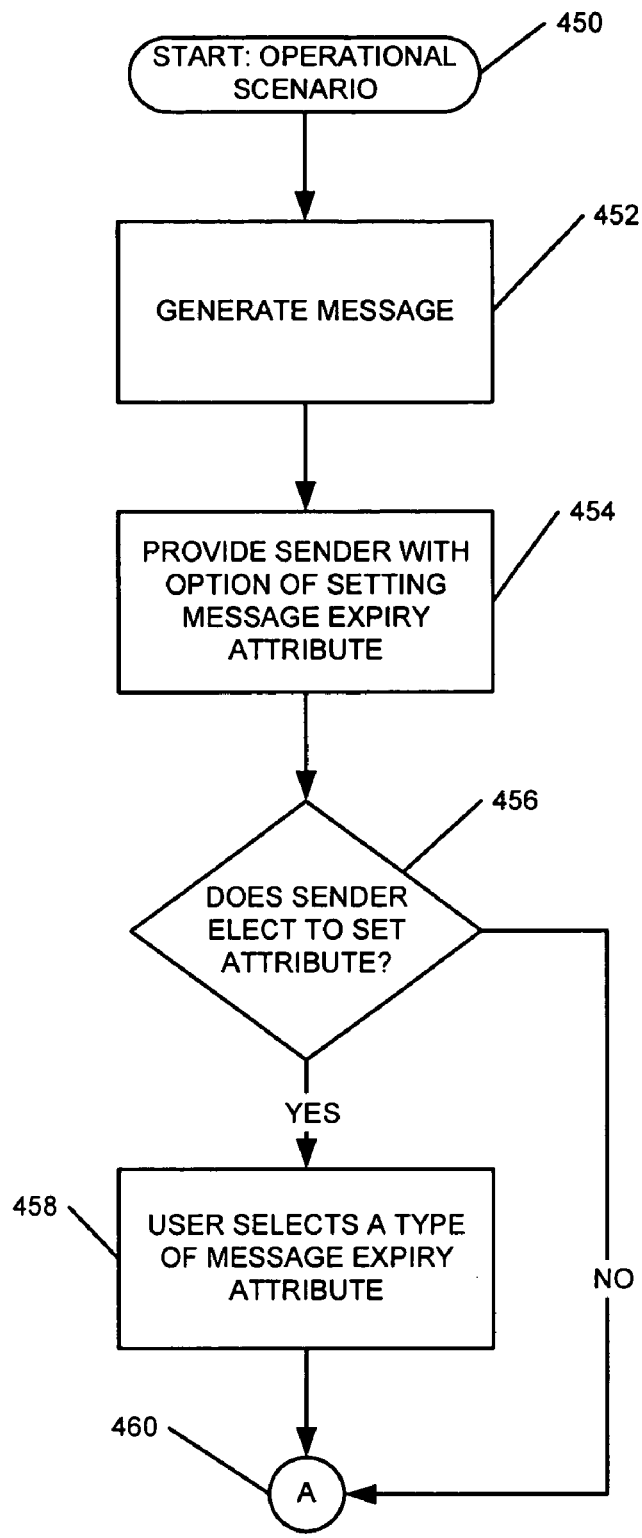

FIG. 10 depicts another operational scenario that illustrates that the sending of a message to one or more recipients can include a combination of automatic and manual operations for associating the message expiry attribute with one or more messages. The operational scenario starts at 450. At process block 452, a message is generated and the sender of the message is provided with an option of setting a message expiry attribute for the generated message at process block 454. If the sender does not decide to set a message expiry attribute as determined at decision block 456, then processing continues on FIG. 11 at decision block 462 as indicated by continuation marker 460.

If the sender does decide to set a message expiry attribute to be associated with the message, the sender selects at process block 458 a type of message expiry attribute. The message expiry attribute is then associated with the generated message. Processing continues on FIG. 11 at decision block 462 as indicated by continuation marker 460.

Figure 11:
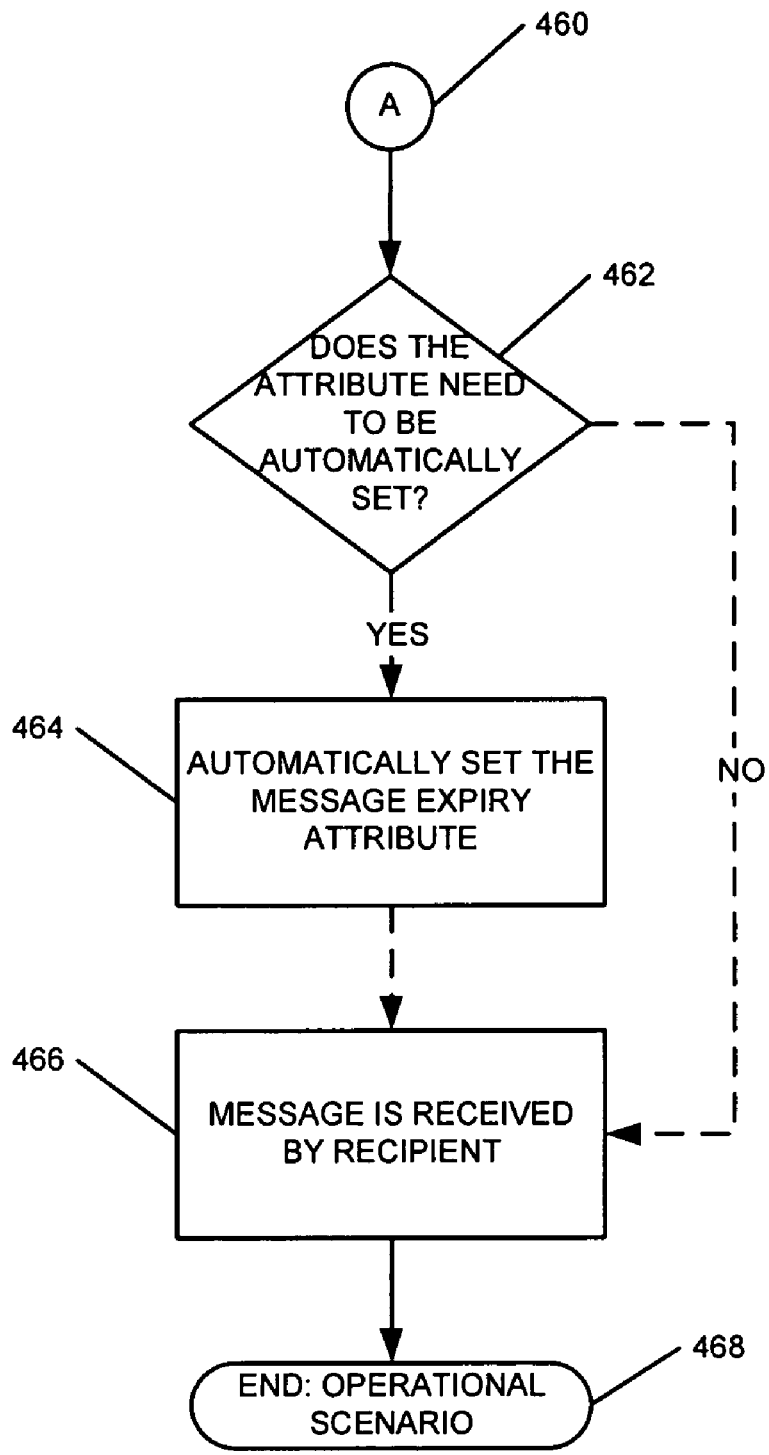

With reference to FIG. 11, decision block 462 determines whether a message expiry attribute needs to be automatically set for the generated message. This automatic determination can be performed at the sender's computer or at any other point along the message transmission path, such as at the sender's and/or recipient's server. Decision step 404 may base its automatic determination upon one or more factors. As an illustration, the automatic determination may be done such that every secure message sent will have a message expiry attribute associated with it, and thus if the sender has not set a message expiry attribute for a secure message, then process block 464 will automatically set the message expiry attribute for the secure message. A system could be configured such that the sender is allowed to set a message expiry attribute for any message irrespective of whether it is secure or not, while the automatic operations will only automatically set a message expiry attribute for a secure message if such an attribute has not already been set by the user for the secure message.

If decision block 462 determines that the message expiry attribute does not need to be set automatically, then processing continues at process block 466 wherein the one or more recipients receive the message. This operational scenario for sending a message to one or more recipients ends at end block 468.

Figure 12:
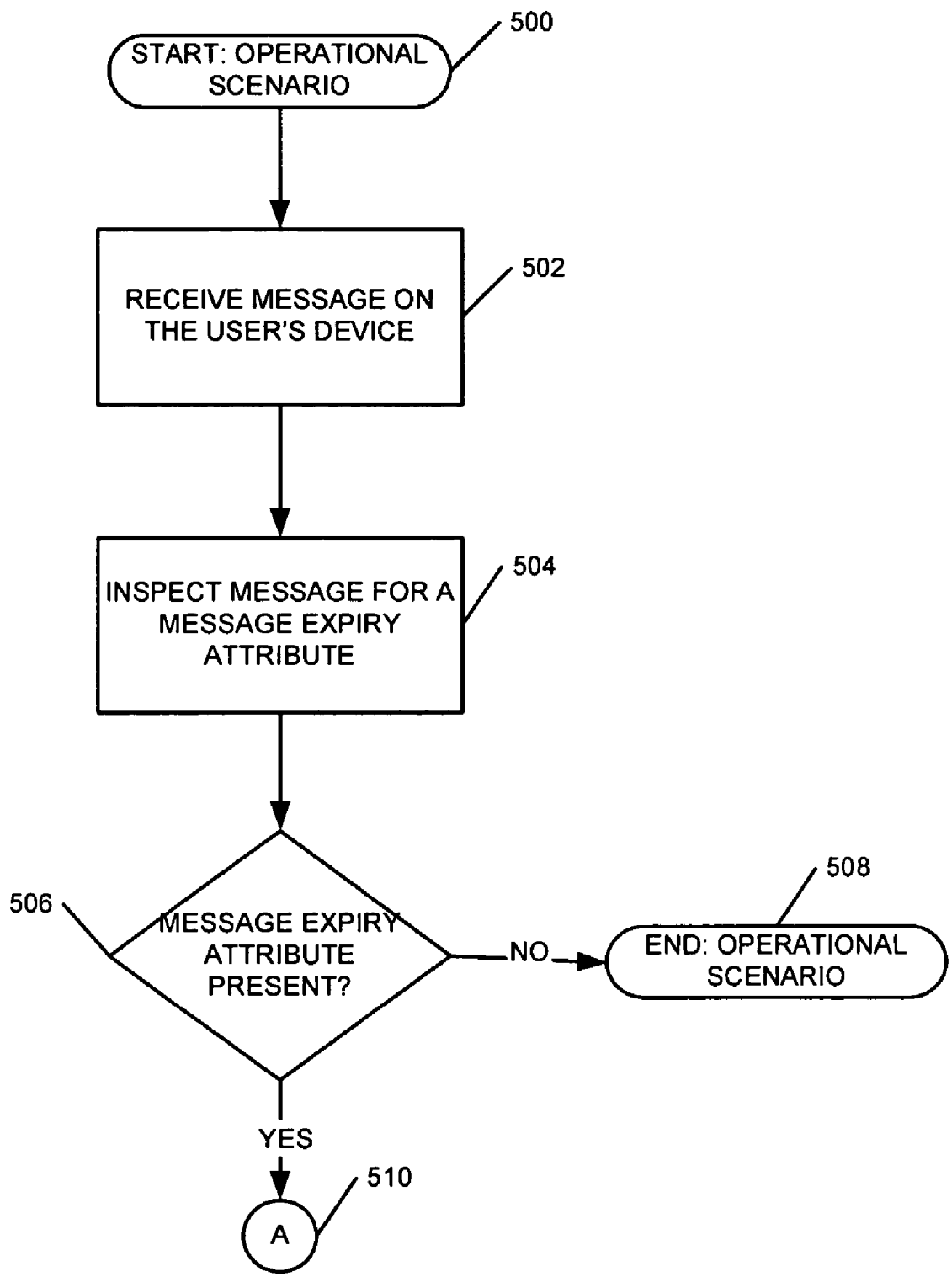

FIG. 12 depicts an operational scenario wherein a recipient receives a message. The operational scenario starts at 500. At process block 502, a message is received on the user's device. Process block 504 inspects the received message for a message expiry attribute. It should be understood that this inspection could occur at any time, such as when the message is initially received by the recipient and/or when the message is opened by a recipient and/or at another time that suits the situation at hand.

Decision block 506 determines whether the message expiry attribute is present. If it is not, then the message can be handled in any typical fashion; and this operational scenario for handling a message ends at 508. However if decision block 506 determines that the message expiry attribute is present, then processing continues on FIG. 13 at process block 512 as indicated by continuation marker 510.

Figure 13:
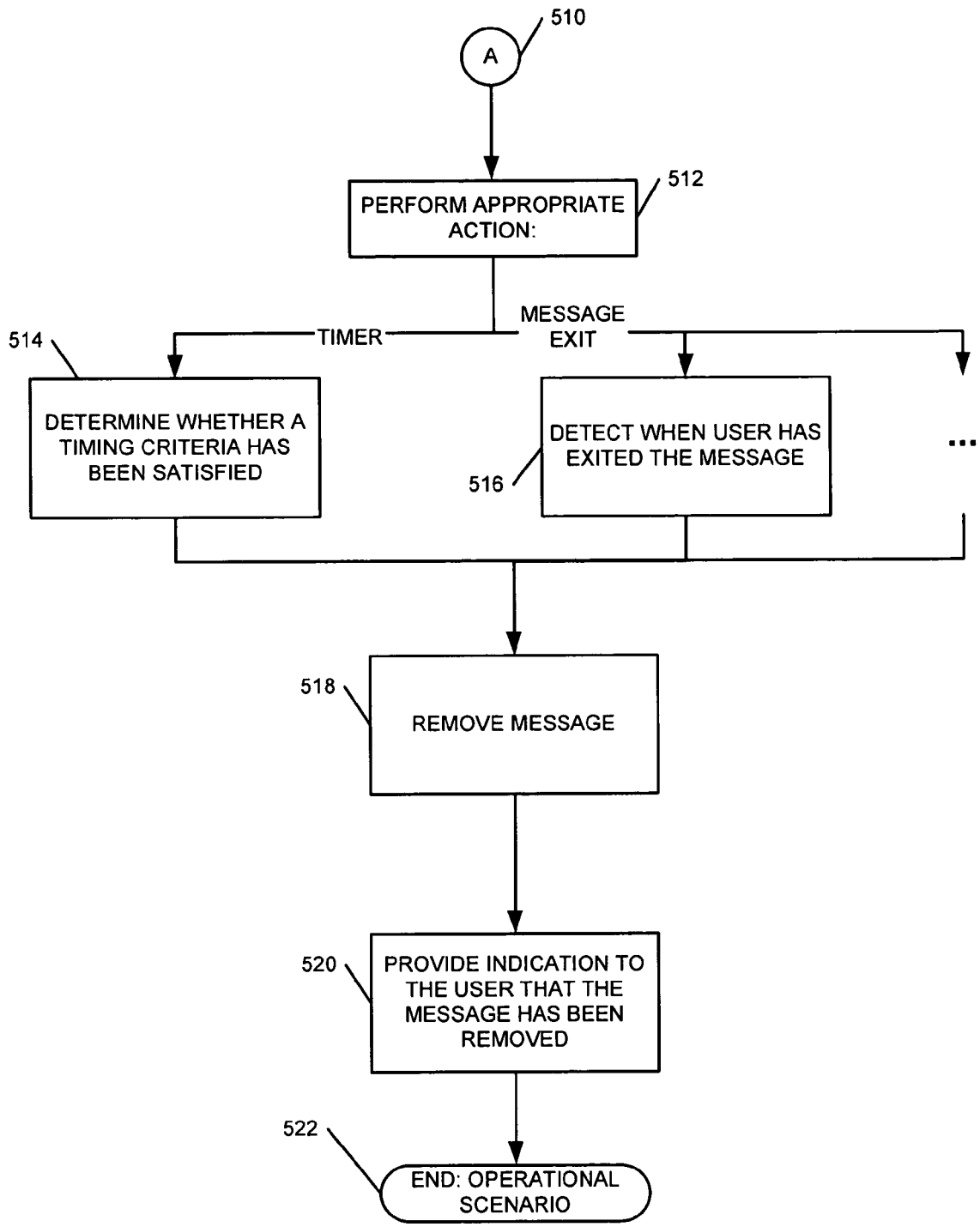

With reference to FIG. 13, process block 512 performs the appropriate action based upon the message expiry attribute. An action may include determining whether a timing criteria has been satisfied, such that the message is to be deleted after it is read or the message is deleted after a specific amount of time (e.g., from when the message is received or read). The message deletion is performed at process block 518.

Another action that might be taken if the message expiry attribute is set is shown at process block 516. Process block 516 detects when the user has exited the message. When the user has exited the message, process block 518 removes the message. It should be understood that different and/or additional actions may be taken if it is determined that the message expiry attribute has been set.

After the message is removed at process block 518, an indication could be provided to the user that the message has been removed at process block 520. Processing for this operational scenario ends at end block 522.

Figure 14:
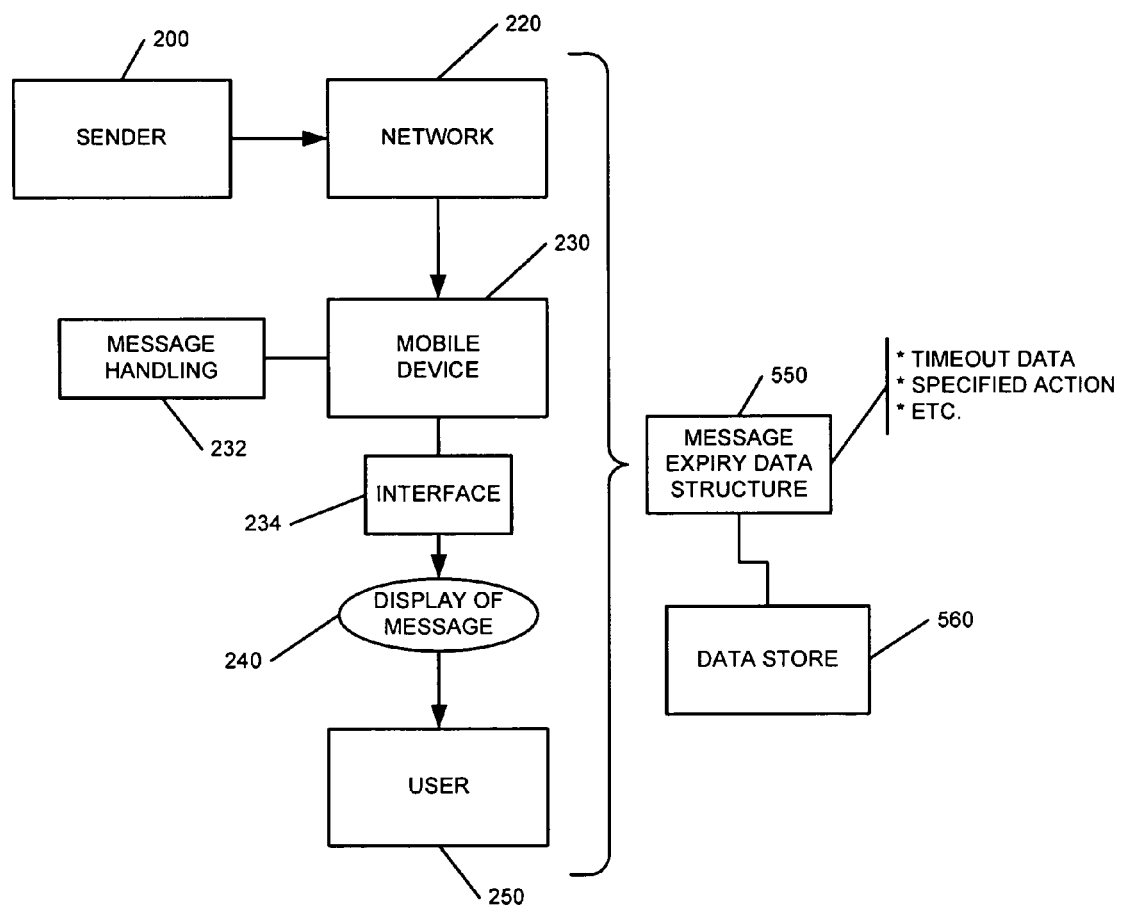
FIG. 14 is a block diagram depicting a data structure stored in a data store that contains message expiry data.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods disclosed herein may be implemented on various types of computer architectures and data signals to/from a device may be conveyed via fiber optic medium, carrier waves, wireless networks, etc. for communication among multiple devices. The systems' and methods' data may also be stored in one or more data stores. For example, FIG. 14 shows that one or more components involved in the message generation, transmission, or receipt and viewing process can have a data structure 550 stored in a data store 560 that contains message expiry data. As an illustration, a data structure 550 could store timeout-related data for when a recipient's device should remove a message as well as other data such as the action that should be taken (e.g., deletion of the message). The data structure 560 can be configured to store any information needed by a mobile device to handle a message expiry indicator (e.g., a message expiry attribute).

The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Figure 15:
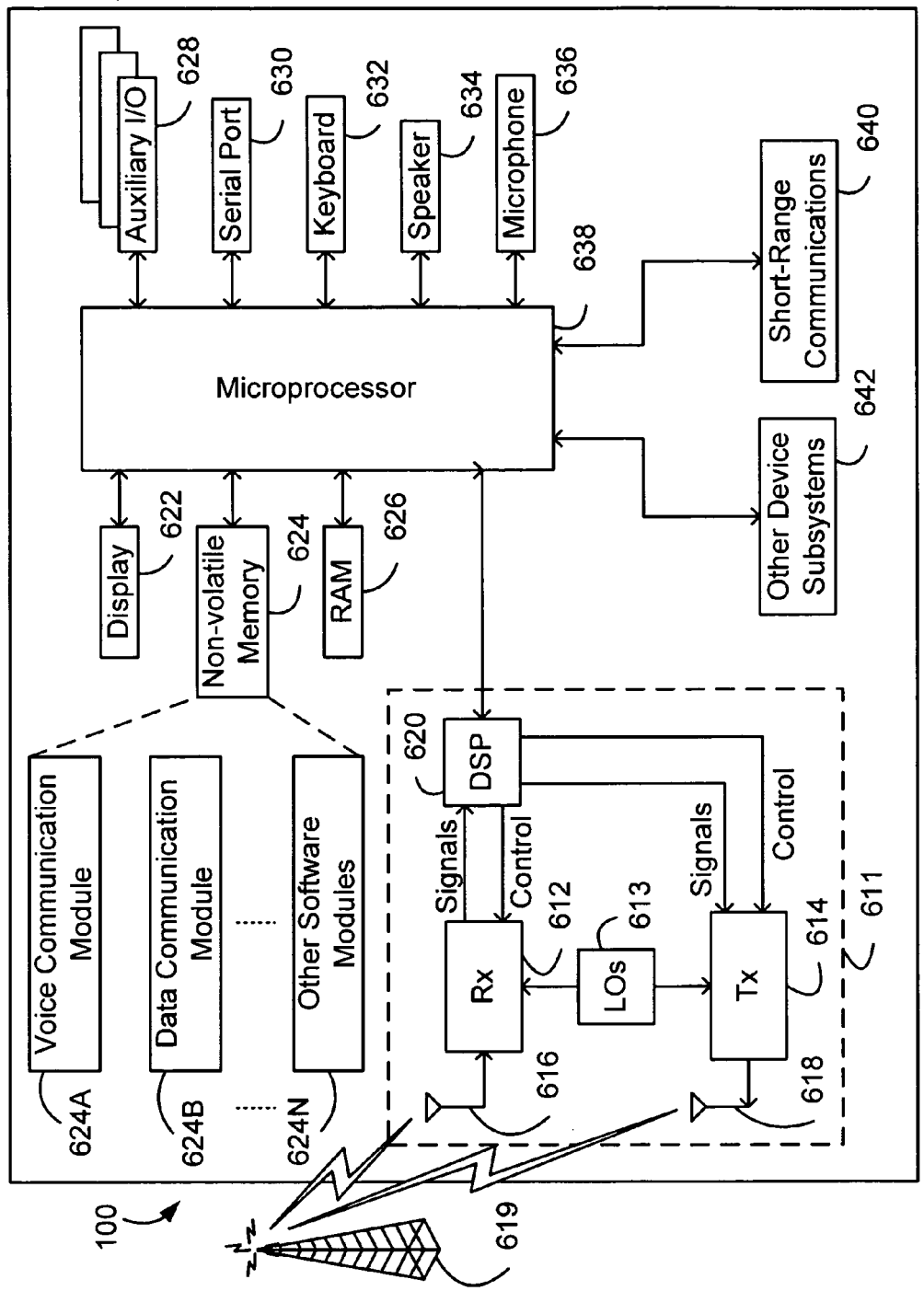
FIG. 15 is a block diagram depicting a wireless mobile communications device.

As another example of the wide scope of the systems and methods disclosed herein, the systems and methods may be used with many different computers and devices, such as a wireless mobile communications device shown in FIG. 15. With reference to FIG. 15, the mobile device 100 is a dual-mode mobile device and includes a transceiver 611, a microprocessor 638, a display 622, non-volatile memory 624, random access memory (RAM) 626, one or more auxiliary input/output (I/O) devices 628, a serial port 630, a keyboard 632, a speaker 634, a microphone 636, a short-range wireless communications sub-system 640, and other device sub-systems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 15 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 15 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code, such as Java.

The systems and methods may be provided on many different types of computer-readable media including storage mechanisms (e.g., CD-ROM, diskette, RAM, flash memory, etc.) that contain instructions for use in execution by a processor to perform the methods' operations and implement the systems described herein. As an example of systems and methods that can be provided on such media, a system and method could include the following. A system and method could be configured to receive at a mobile device a message that is associated with a message expiry indicator. If a message expiry indicator is determined to be associated with the received message, then the received message is removed from the mobile device.

As another example, a system and method can be configured to receive, at the mobile device over a network, a message that is associated with a message expiry indicator. The system and method can determine whether a message expiry indicator is associated with the received message. If a message expiry indicator is determined to be associated with the received message, then the received message is removed from the mobile device if a removal criterion based upon the message expiry indicator is satisfied.

As another example, a system and method can include processor instructions to receive, at the mobile device over a network, a message that is associated with a message expiry indicator. Message handling processor instructions can be configured to determine whether a message expiry indicator is associated with the received message. If a message expiry indicator is determined to be associated with the received message, then the received message is removed from the mobile device if a removal criterion associated with the message expiry indicator is satisfied.

As another example, a data store can be used that is an article of manufacture for storing a data structure. The data structure can include message expiry attribute data. The message expiry data can be configured for use with a message that is provided to a mobile device over a network. The message is removed from the mobile device if a removal criterion based upon the message expiry indicator is satisfied.

As yet another example, a system and method can be configured to ensure a sender that a sent top-secret message does not linger on devices. A system and method can be used that makes it easier for recipient devices to remove these messages. As yet another example, a system and method can be configured to remove a message from a recipient's device after it has been read or after a certain period of time from when the message was received. As another example, a sender's device can be configured to set content expiry attribute(s) for all messages or only for select messages, such as secure e-mail messages (e.g., S/MIME or PGP).

It is claimed:

1. A method for disposing of secure messages on a mobile device, comprising:
   receiving, at a network device, a message;
   determining whether the message is a secure message;
   determining whether a message expiry indicator is associated with the message;
   automatically setting a message expiry indicator for the message if the message is determined to be a secure message and there is not a message expiry indicator already associated with the message;
   receiving at a mobile device the message; and
   removing the message from the mobile device if a removal criterion based upon the message expiry indicator is satisfied.

2. The method of claim 1, wherein the message is an e-mail message.

3. The method of claim 2, wherein content of the e-mail message is considered to be sensitive, secure or confidential.

4. The method of claim 3, wherein use of the message expiry indicator by the mobile device allows the message, which is considered to be sensitive, secure or confidential, to be properly disposed.

5. The method of claim 1, wherein the message's sender chooses that the message expiry indicator is to be associated with the message that is to be sent to one or more recipients.

6. The method of claim 5, wherein the message's sender can select which form of message expiry indicator the sender wishes the message to be associated with.

7. The method of claim 6, wherein information contained in the message expiry indicator is encoded in a signed attribute of the secure e-mail message.

8. The method of claim 1, wherein the removal criterion is based upon whether the message has been accessed by a user.

9. The method of claim 1, wherein the removal criterion is based upon whether the mobile device has received an entire message and whether the entire message has been displayed on the mobile device.

10. The method of claim 1, wherein the removal criterion is time-based.

11. The method of claim 10, wherein the message expiry indicator contains a timeout notification expiry attribute;
   wherein a timer is set for the timeout period specified in the timeout notification expiry attribute;
   wherein when the timer expires, the message is automatically removed from the mobile device.

12. The method of claim 11, wherein the timer is started after the message is closed or when the message is received.

13. The method of claim 1, wherein the message expiry indicator specifies a period of time;
   wherein the message is removed after the specified period of time has elapsed relative to when the message is received by the mobile device or relative to when the message is read by a user, whichever comes first.

14. The method of claim 1, wherein the message expiry indicator is automatically set for the message before the message is received by the mobile device.

15. The method of claim 1, wherein the secure message is a message that is a PGP or an S/MIME message.

16. The method of claim 1, wherein the network includes a wireless communications network.

17. The method of claim 1, wherein the mobile device is a wireless mobile communications device.

18. The method of claim 1, wherein the mobile device is a personal digital assistant (PDA).

19. A non-transitory computer-readable medium capable of causing a computing device to perform the method of claim 1.

20. A system for disposing of secure messages on a mobile device, comprising:
   a network device configured to:
      receive a message;
      determine whether the message is a secure message;
      determine whether a message expiry indicator is associated with the message;
      automatically set a message expiry indicator for the message if the message is determined to be a secure message and there is not a message expiry indicator already associated with the message; and
   a mobile device configured to:
      receive the message from the network device; and
      remove the message from the mobile device if a removal criterion based upon the message expiry indicator is satisfied.

* * * * *